United States Patent [19]
Watanabe

[11] Patent Number: 5,161,431
[45] Date of Patent: Nov. 10, 1992

[54] TRANSMISSION DEVICE

[75] Inventor: Hiroshi Watanabe, Maebashi, Japan

[73] Assignee: Mitsuba Electric Manufacturing Co., Ltd., Gunma, Japan

[21] Appl. No.: 823,059

[22] Filed: Jan. 17, 1992

Related U.S. Application Data

[63] Continuation of Ser. No. 540,487, Jun. 19, 1990, abandoned.

[30] Foreign Application Priority Data

Jun. 19, 1989 [JP] Japan ................. 1-71476[U]

[51] Int. Cl.⁵ .................. F16H 1/16; F16H 57/02
[52] U.S. Cl. .................. 74/606 R; 74/425
[58] Field of Search .......... 74/606 R, 425, 625, 74/89.14, 505, 545; 192/1.37, 8 R; 310/78, 83; 403/349; 49/349

[56] References Cited

U.S. PATENT DOCUMENTS

| | | | |
|---|---|---|---|
| 2,745,238 | 5/1956 | Hopkins | 74/604 |
| 3,789,690 | 2/1974 | Droske | 74/425 X |
| 4,367,660 | 1/1983 | Becker et al. | 74/425 X |
| 4,428,250 | 1/1984 | Becker et al. | 74/425 |
| 4,643,040 | 2/1987 | Adam et al. | 74/425 |
| 4,766,777 | 8/1988 | Hartz et al. | 74/606 R |
| 4,770,056 | 9/1988 | Becker et al. | 74/425 X |
| 4,800,771 | 1/1989 | Edwards et al. | 74/606 R |
| 4,885,948 | 12/1989 | Thrasher et al. | 74/425 X |
| 4,899,608 | 2/1990 | Knappe et al. | 49/349 |
| 4,944,375 | 7/1990 | Ohta et al. | 192/8 R |
| 4,970,913 | 11/1990 | Kielar et al. | 74/606 R |
| 4,980,591 | 12/1990 | Takanashi et al. | 310/83 |

FOREIGN PATENT DOCUMENTS

| | | | |
|---|---|---|---|
| 0838208 | 6/1981 | U.S.S.R. | 74/425 |
| 1165832 | 7/1985 | U.S.S.R. | 74/425 |

Primary Examiner—Vinh T. Luong
Attorney, Agent, or Firm—Oliff & Berridge

[57] ABSTRACT

A grease guide structure for a transmission device suitable for a sunroof of an automobile or the like. The transmission device includes a worm wheel and a pinion shaft, which are drivingly connected through a friction clutch mechanism. In order to prevent grease flowing from the worm wheel onto the friction clutch mechanism, a cup washer is mounted between the worm wheel and the friction clutch mechanism, with the center portion of the cup washer being higher than its peripheral portion. Therefore, if grease falls onto the cup washer, it will further flow and finally fall into a grease intake slot which is arranged below the cup washer to be stored therein.

12 Claims, 3 Drawing Sheets

TRANSMISSION DEVICE

This is a continuation of application Ser. No. 07/540,487 filed Jun. 19, 1990, now abandoned.

BACKGROUND OF THE INVENTION

The present invention relates to an improved transmission device, and more particularly, to a grease guide structure of a sunroof transmission device for opening and shutting a roof of a vehicle, such as an automobile.

In a general sunroof transmission device of this type, in consideration of safety, a worm wheel and a pinion shaft are drivingly connected through a friction clutch mechanism by fitting a retaining pawl, which projects upward from a clutch plate constituting the friction clutch mechanism arranged on the output side of the pinion shaft, in a retaining hole formed on the bottom plane of the worm wheel to which a motor driving force is input. However, if grease filled in a rotatable portion or a gear engaging portion of the worm wheel flows into the friction clutch mechanism, friction clutch operations are damaged. Therefore, conventionally, a concave slot for gathering the grease is formed on a cup washer which separates an upper worm wheel portion and a lower friction clutch portion in order to prevent the grease from flowing into the friction clutch portion. However, a demand for making the transmission device light and compact also makes the attachment space for the cup washer small and as a result, the amount of grease capable of being stored is decreased and it is feared that the grease will overflow from the cup washer. Therefore, it has been necessary to solve this problem.

SUMMARY OF THE INVENTION

With the above problem in view, an object of the present invention is to provide a grease guide structure of a sunroof transmission device which can eliminate such a defect.

The present invention relates to an improved transmission, comprising
i) means for receiving a driving force;
ii) means for outputting said driving force from said receiving means;
iii) friction means for transmitting said driving force from said receiving means to said outputting means;
iv) means for lubricating said receiving means, said lubricating means including a grease reservoir for containing excess grease from said receiving means;
v) a cup washer to prevent grease from contacting said friction means, said cup washer adapted to collect excess grease from said receiving means and to conduct said excess grease to said grease reservoir.

BRIEF DESCRIPTION OF THE DRAWINGS

In the accompanying drawings, which show an embodiment of a grease guide structure of a sunroof transmission device according to the present invention.

DETAILED DESCRIPTION OF PREFERRED EMBODIMENTS

The present invention is characterized in that a worm wheel and a pinion shaft are drivingly connected through a friction clutch mechanism by fitting a retaining pawl, which projects upward from a clutch plate constituting the friction clutch mechanism arranged on the output side of the pinion shaft, in a retaining hole formed on a bottom plane of the worm wheel to which a motor driving force is input, a cup washer, which separates the upper worm wheel and the lower clutch mechanism, is formed to have a level difference or an incline so that the center portion of the cup washer is higher than the peripheral portion, a peripheral edge portion of a penetrating hole, through which the retaining pawl of the clutch plate penetrates, projects upward, and an outer peripheral edge portion of the cup washer projects downward to face a grease intake slot on a lower bracket arranged so as to cover the bottom portion of the worm wheel.

According to this structure, the present invention is intended to guide the grease, which is ejected, into a grease intake slot which is formed on a lower bracket arranged to cover the bottom portion of the worm wheel and to store a great amount of grease therein.

Figure 1:
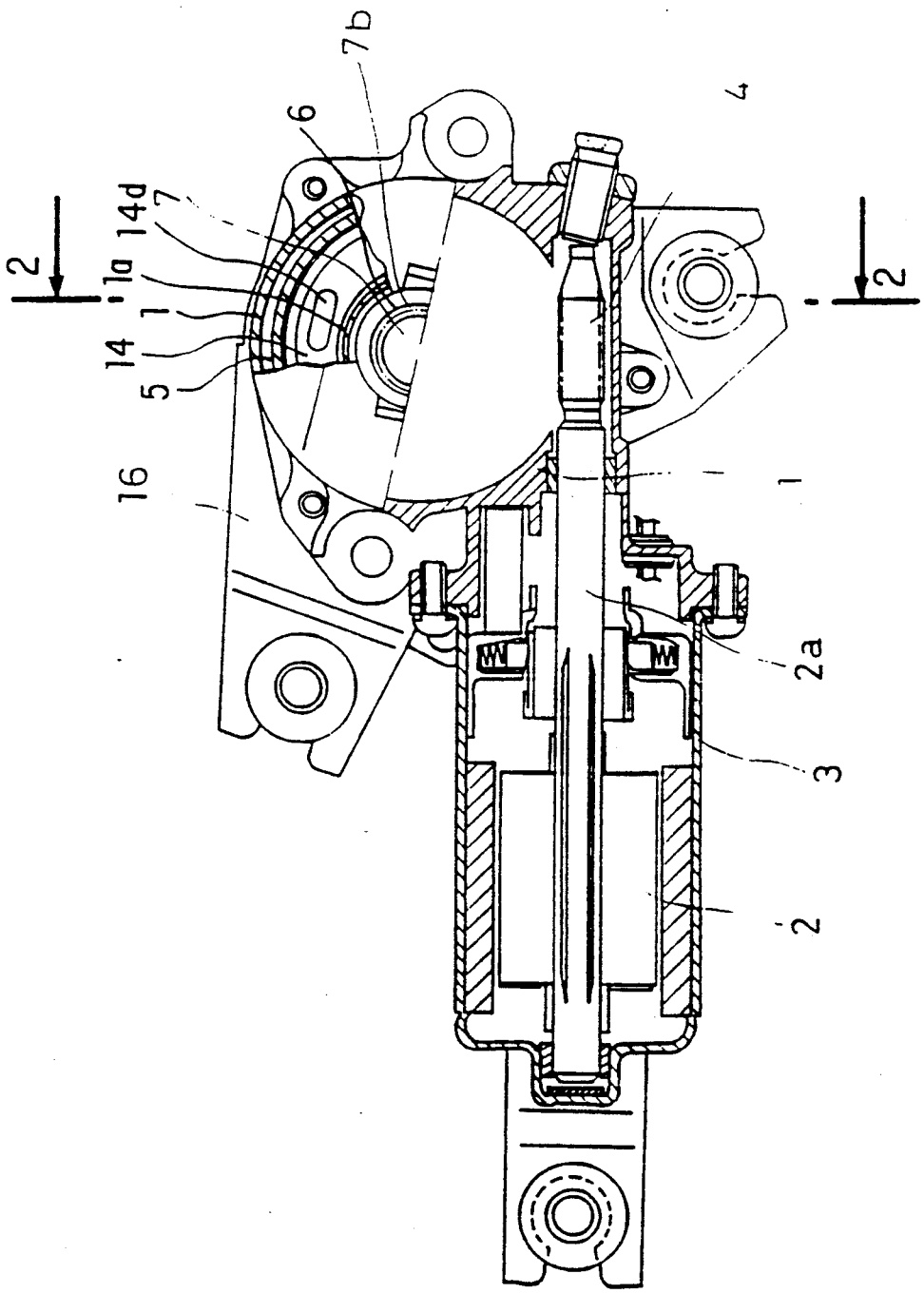
FIG. 1 is a partial horizontal sectional view of a case frame for a sunroof through the plane 2—2 shown on FIG. 2.
Figure 2:
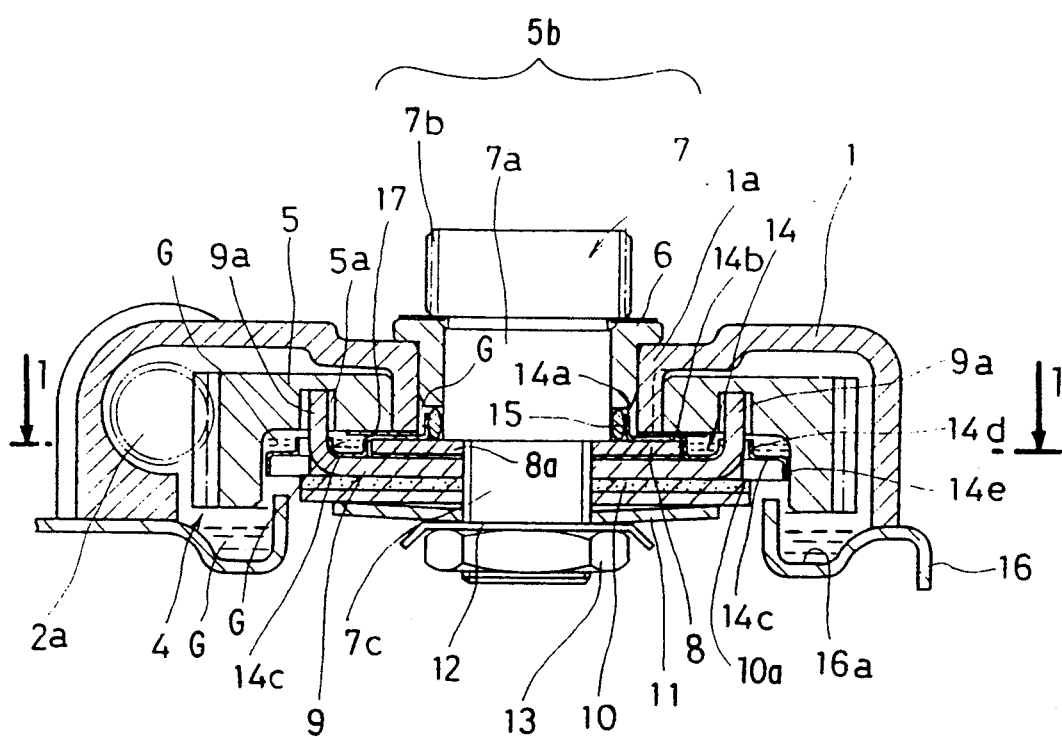
FIG. 2 is a partial vertical sectional view of the case frame shown in FIG. 1 through the plane 1—1 of FIG. 1.
Figure 3:
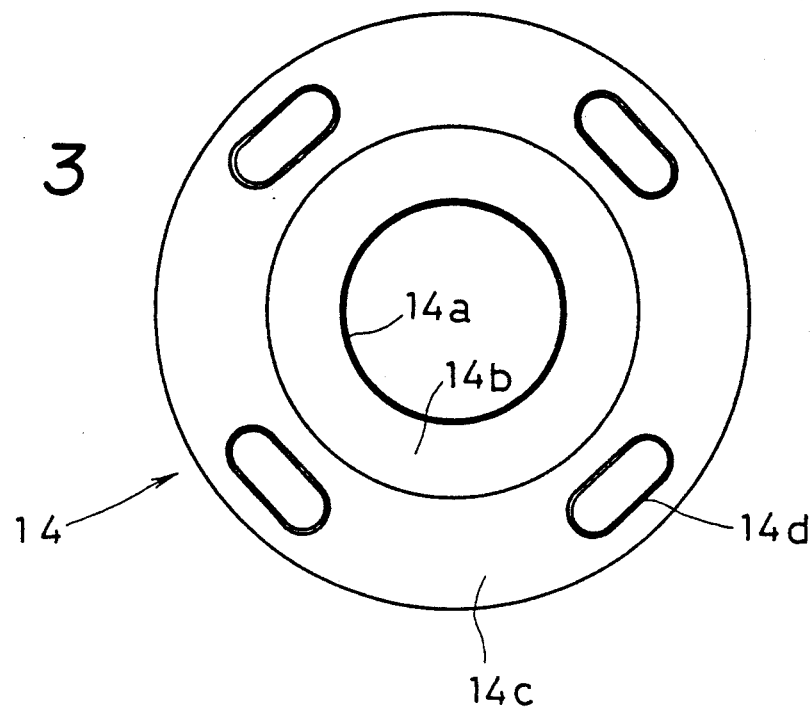
FIG. 3 is a top view of a cup washer.
Figure 4:
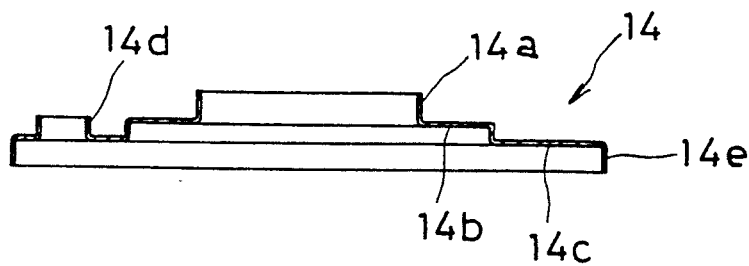
FIG. 4. is a vertical sectional view of the cup washer shown in FIG. 3.
Figure 5:
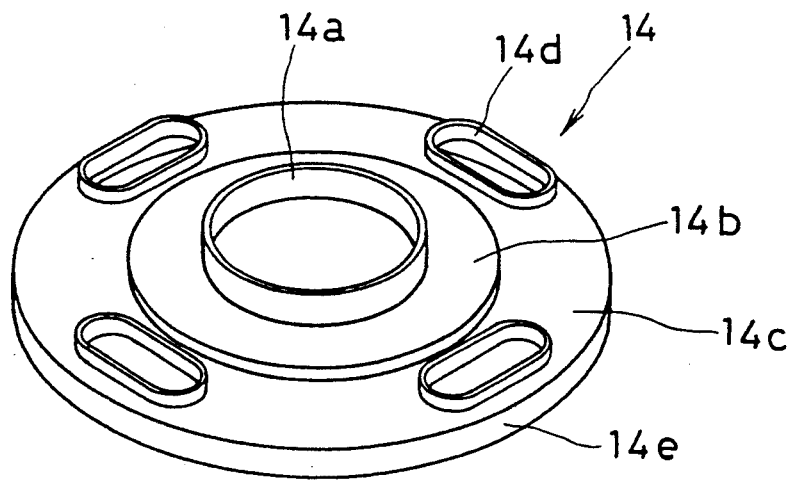
FIG. 5 is a perspective view of the cup washer shown in FIG. 3.

Referring to the drawings, an embodiment of the present invention will be explained. In FIGS. 1 and 2, 1 denotes a case frame for housing a transmission device for a sunroof. A yoke 3, for housing an armature core 2, is unitedly attached to the case frame 1 and a leading end of a core shaft (motor shaft) 2a is drivingly connected to a worm wheel 5 through a worm gear mechanism 4. Means for receiving a driving force may comprise a worm wheel 5, which is rotatably and pivotably supported by an outer periphery of a boss tube 1a of the case frame 1. A pivot portion 7a of a pinion shaft 7 is rotatably and pivotably supported by an inner periphery of the boss tube 1a through a bearing 6. Boss tube 1a, pivot portion 7a and bearing 6 are positioned in a central portion 5b of worm wheel 5a, as shown in FIG. 2. Means for outputting a motor driving force, such as pinion gear 7b, is formed at an upper end of the pinion shaft 7 which projects from case frame 1. On the other hand, formed under the pivot portion 7a is a screw portion 7c which is double chamfered. Friction means for transmitting a driving force may include friction plate 8, a clutch plate 9, a friction plate 10, a dished plate 11, a whirl-stop 12, and a nut 13, all fitted on the screw portion 7c from the top in this order. Each of the friction plates 8 and 10, or the whirl-stop 12, has a structure in plane contact with the above chamfered portion so as to rotate together with the pinion shaft 7, and the clutch 9 and the dished plate 11 are freely rotatable. Furthermore, a retaining pawl 9a projects upward on the clutch plate 9 and is fitted and retained in a retaining hole 5a which is formed at the bottom of the worm wheel 5. This arrangement enables the worm wheel 5 and the clutch plate 9 to rotate together. The motor driving force input to the worm wheel 5 is transmitted and output from the clutch plate 9 to the pinion shaft 7 through the friction plates 8 and 10. In this structure, if the load on the side of the pinion shaft 7 becomes too much, the clutch plate 9 and the friction plates 8 and 10 slip and the transmission of driving force is stopped. The friction clutch mechanism is thus constructed.

Cup washer 14 is arranged to separate the lower friction clutch mechanism and the upper worm wheel 5. The cup washer 14 is positioned on the friction plate 8 and is rotatably fitted on the pivot portion 7a of the pinion shaft 7 through an O-ring 15. An inner peripheral portion 14a of the cup washer 14 for receiving the 0-ring 15 projects upward. A first faceplate portion 14b connected to the inner peripheral portion 14a is arranged in slidable contact with the top plane of the friction plate 8. A second faceplate portion 14c is positioned lower than the first faceplate portion 14b and is arranged in slidable contact with the top plane of clutch plate 9. Furthermore, formed on the second faceplate portion 14c is a pawl hole 14d through which the retaining pawl 9a penetrates and whose peripheral edge is formed to project upward. An outer peripheral portion 14e connected to the second faceplate portion 14c projects downward. The second face plate portion 14c and the outer peripheral portion 14e extended beyond the outer edges 8a and 10a of friction plates 8 and 10.

Lower bracket 16 which covers the bottom of the worm wheel 5, has an opening to uncover the bottom of the pinion shaft 7, and is fixed as a unit to the case frame 1. A concave grease intake slot 16a is formed on the peripheral edge of the opening of the lower bracket 16 so that the outer peripheral portion 14e is positioned above the grease intake slot 16a. The means for lubricating the receiving means fills the rotatable pivot portion of the worm wheel 5 with grease G. Any excess grease G will overflow onto the top plane of the cup washer 14, gradually flow onto the second faceplate portion 14c, which is lower than the top plane, and finally will be guided into the grease intake slot 16a through the outer peripheral portion 14e. Flat washer 17 is mounted on the top plane of the first faceplate portion 14b.

In the above embodiment of the present invention, the motor driving force is, as described above, transmitted to the pinion shaft 7 through the worm wheel 5, the clutch plate 9 and the friction plates 8 and 10 and output from the pinion gear 7b. Since the friction clutch mechanism comprising the clutch plate 9 and the friction plates 8 and 10 is separated from the upper side, where the worm wheel 5 is mounted, by the cup washer 14, the grease G overflowing the side of the worm wheel 5 does not directly fall onto the friction clutch mechanism. The grease G which flows onto the top plane of the cup washer 14 gradually flows onto the side of the outer peripheral portion 14e, which is lower than the top plane, and flows and gathers in the grease intake slot 16a formed at the lower bracket 16.

Thus, the present invention improves the state of the art in that the grease G flowing into the cup washer 14 does not stay in the cup washer 14 but instead falls and enters in the grease intake slot 16a formed at the lower bracket 16 which is lower than the cup washer 14. Therefore, it is unnecessary to have a space for storing the grease G in the cup washer 14 and even if an attachment space for the cup washer 14 is small, there is no fear of grease leaking. Since the lower bracket 16 originally has the function of gathering the grease G flowing out from the worm gear mechanism 4 and has a structure capable of storing much grease G, the lower bracket 16 can store the grease G flowing out from the cup washer 14 without any difficulty. Even if the grease G flows out from the lower bracket 16, the grease G does not fall onto the friction clutch mechanism, and therefore the friction clutch mechanism can be reliably protected from the grease G.

In addition, since the cup washer peripheral edge surrounding the pawl hole 14d, through which the retaining pawl 9a projecting upward from the clutch plate 9 penetrates, projects upward, the grease G falling onto the top plane of the cup washer 14 can be prevented from flowing into the friction clutch mechanism through the pawl hole 14d. As a result, it is possible to reliably protect the friction clutch mechanism from an inflow of grease G and to reliably perform clutch operations for a long time.

One of ordinary skill will understand that the present invention is not limited to the above embodiment. For example, the cup washer may be inclined rather than level so that the center is higher than the outer peripheral portion.

According to the arrangement of the present invention described above, the grease falling from the side of the worm wheel onto the top plane of the cup washer gradually flows onto the side of the outer peripheral portion of the cup washer, which is lower than the top plane. This occurs because the cup washer, which separates the upper worm wheel and the lower friction clutch mechanism, has a center portion which is higher than its outer peripheral portion and the outer portion projects downward to form the lowest portion of the cup washer. Furthermore, the cup washer is provided with a pawl hole through which the retaining pawl projects upward from the clutch plate, such that the peripheral edge surrounding the pawl hole is also formed to project upward, and therefore, grease is prevented from flowing onto the side of the friction clutch mechanism through the pawl hole. Instead, grease will fall from the outer peripheral portion into the grease intake slot formed at the lower bracket and stored therein. As a result, it is unnecessary to form a space for storing the grease in the cup washer and this can greatly contribute to making the transmission device small and light.

What is claimed is:

1. A transmission, comprising:
   i) means for receiving a driving force, said receiving means rotating about a longitudinal axial direction;
   ii) means for outputting said driving force from said receiving means, said outputting means rotating about said longitudinal axial direction and positioned at a central portion of said receiving means;
   iii) a lubricant for lubricating said receiving means, said lubricant including excess grease from said receiving means;
   iv) friction means for transmitting said driving force from said receiving means to said outputting means, said friction means being arranged about said longitudinal axial direction and positioned below said lubricated receiving means;
   v) a cup washer between said friction means and said lubricated receiving means, said cup washer having an outer peripheral area extending beyond an outer edge of the friction means, and receiving excess grease dropping from said lubricated receiving means, for collecting and guiding said excess grease toward the outer peripheral area of said cup washer to prevent said collected excess grease from contacting said friction means; and
   vi) a grease reservoir positioned below said friction means, said grease reservoir collecting a portion of said excess grease dropping from said outer peripheral area of said cup washer.

2. The improved transmission of claim 1, wherein said cup washer has a first faceplate portion having a first plane and a peripheral second faceplate portion which is on a second plane.

3. The improved transmission of claim 2, wherein said peripheral second faceplate portion is planar, and has an outer portion which projects out of said second plane so as to conduct said excess grease to said grease reservoir.

4. The improved transmission of claim 1, wherein said receiving means comprises a worm wheel.

5. The improved transmission of claim 4, wherein said grease reservoir comprises a grease intake slot formed on a bracket adapted to cover a bottom portion of said worm wheel.

6. The improved transmission of claim 1, wherein said outputting means comprises a pinion gear having a screw portion.

7. The improved transmission of claim 6, wherein said friction means includes at least one friction plate fixedly mounted on said screw portion and in planar contact with a clutch plate freely rotatably mounted on said screw portion and drivingly connected to said receiving means.

8. The improved transmission of claim 7, wherein said clutch plate is drivingly connected to said receiving means by a retaining pawl.

9. The improved transmission of claim 1, wherein said cup washer is arranged between said receiving means and said outputting means.

10. The improved transmission of claim 8, wherein said cup washer has a first faceplate portion which is connected to an inner peripheral portion adapted to receive an O-ring fitted on a pinion shaft, and said first faceplate portion being arranged in slidable contact with a top plane of said friction plate, and a second faceplate portion, which is connected to said first faceplate portion, being arranged lower than said first faceplate portion and is in slidable contact with a top plane of said clutch plate.

11. The improved transmission of claim 10, wherein said second faceplate portion has a plurality of holes through which said retaining pawl penetrates, said holes being spaced symmetrically apart.

12. The improved transmission of claim 11, wherein said holes are elliptical in shape.

* * * * *